United States Patent
Reinschke

(10) Patent No.: US 7,372,221 B2
(45) Date of Patent: May 13, 2008

(54) DEVICE FOR ADJUSTING THE ARMATURE STROKE IN A REVERSIBLE LINEAR DRIVE UNIT

(75) Inventor: Johannes Reinschke, Nürnberg (DE)

(73) Assignee: BSH Bosch und Siemens Hausgaraete GmbH, Munich (DE)

( * ) Notice: Subject to any disclaimer, the term of this patent is extended or adjusted under 35 U.S.C. 154(b) by 0 days.

(21) Appl. No.: 10/591,088

(22) PCT Filed: Mar. 7, 2005

(86) PCT No.: PCT/EP2005/050998

§ 371 (c)(1),
(2), (4) Date: May 25, 2007

(87) PCT Pub. No.: WO2005/086327

PCT Pub. Date: Sep. 15, 2005

(65) Prior Publication Data

US 2007/0236160 A1    Oct. 11, 2007

(30) Foreign Application Priority Data

Mar. 5, 2004   (DE) .................. 10 2004 010 846

(51) Int. Cl.
*H02K 33/16* (2006.01)
*H02K 41/00* (2006.01)

(52) U.S. Cl. .............. 318/135; 318/119; 417/411; 417/22

(58) Field of Classification Search ........ 318/119–121, 318/135, 138, 139; 417/22, 411; 361/187
See application file for complete search history.

(56) References Cited

U.S. PATENT DOCUMENTS

| 4,726,738 | A | * | 2/1988 | Nakamura et al. | ............ 417/22 |
| 5,018,357 | A | * | 5/1991 | Livingstone et al. | ............ 62/6 |
| 5,736,797 | A | | 4/1998 | Motohashi et al. | |
| 5,980,211 | A | | 11/1999 | Tojo et al. | |
| 6,437,524 | B1 | * | 8/2002 | Dimanstein | ................. 318/135 |
| 6,623,255 | B2 | * | 9/2003 | Joong et al. | ................. 417/411 |
| 7,184,254 | B2 | * | 2/2007 | Dimanstein | ................. 361/187 |
| 2002/0121816 | A1 | | 9/2002 | Qiu et al. | |
| 2002/0176790 | A1 | | 11/2002 | Akazawa et al. | |

(Continued)

FOREIGN PATENT DOCUMENTS

JP         2002-31054         1/2002

(Continued)

OTHER PUBLICATIONS

International Search Report PCT/EP2005/050998.

*Primary Examiner*—Paul Ip
(74) *Attorney, Agent, or Firm*—Russell W. Warnock; James E. Howard

(57) ABSTRACT

A device for adjusting the armature stroke in a reversible linear drive unit comprising an excitation coil and an armature displaceable in the magnetic field of the excitation coil according to a linear oscillating motion at a predefined armature stroke. The device comprising systems for detecting the current armature position, systems for measuring the actual excitation coil current and systems for adjusting the excitation coil current in such a way that the armature is exactly supplied with electric energy for obtaining the aptitude of oscillations of the armature stroke during each half-wave of the armature motion.

13 Claims, 3 Drawing Sheets

U.S. PATENT DOCUMENTS

Figure 1:
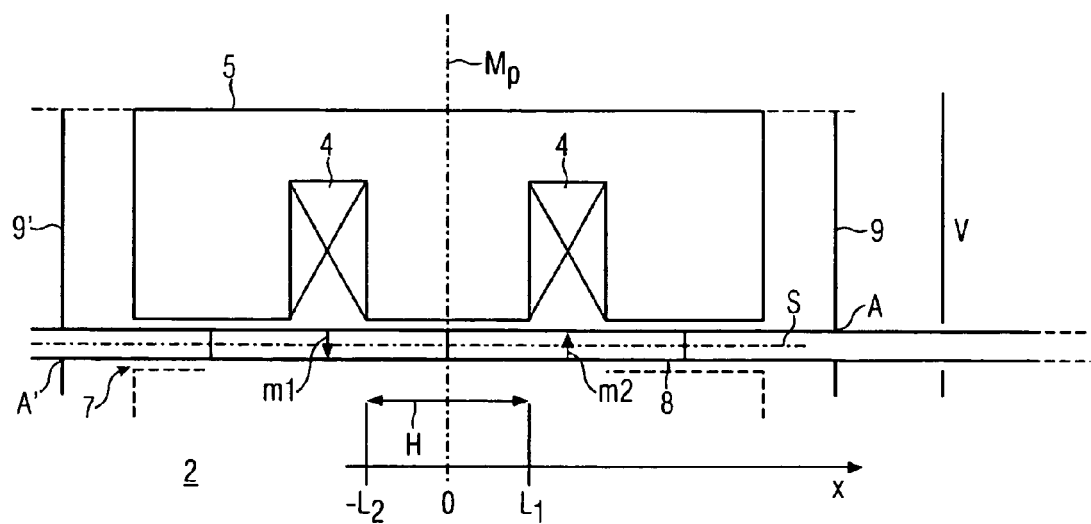

| | | | |
|---|---|---|---|
| 2003/0059320 A1* | 3/2003 | Kim et al. | 417/411 |
| 2003/0218854 A1* | 11/2003 | Dimanstein | 361/187 |
| 2004/0005222 A1 | 1/2004 | Yoshida et al. | |
| 2007/0236160 A1* | 10/2007 | Reinschke | 318/135 |
| 2007/0257562 A1* | 11/2007 | Reinschke et al. | 310/12 |

FOREIGN PATENT DOCUMENTS

| | | |
|---|---|---|
| WO | WO 00/16482 | 3/2000 |

* cited by examiner

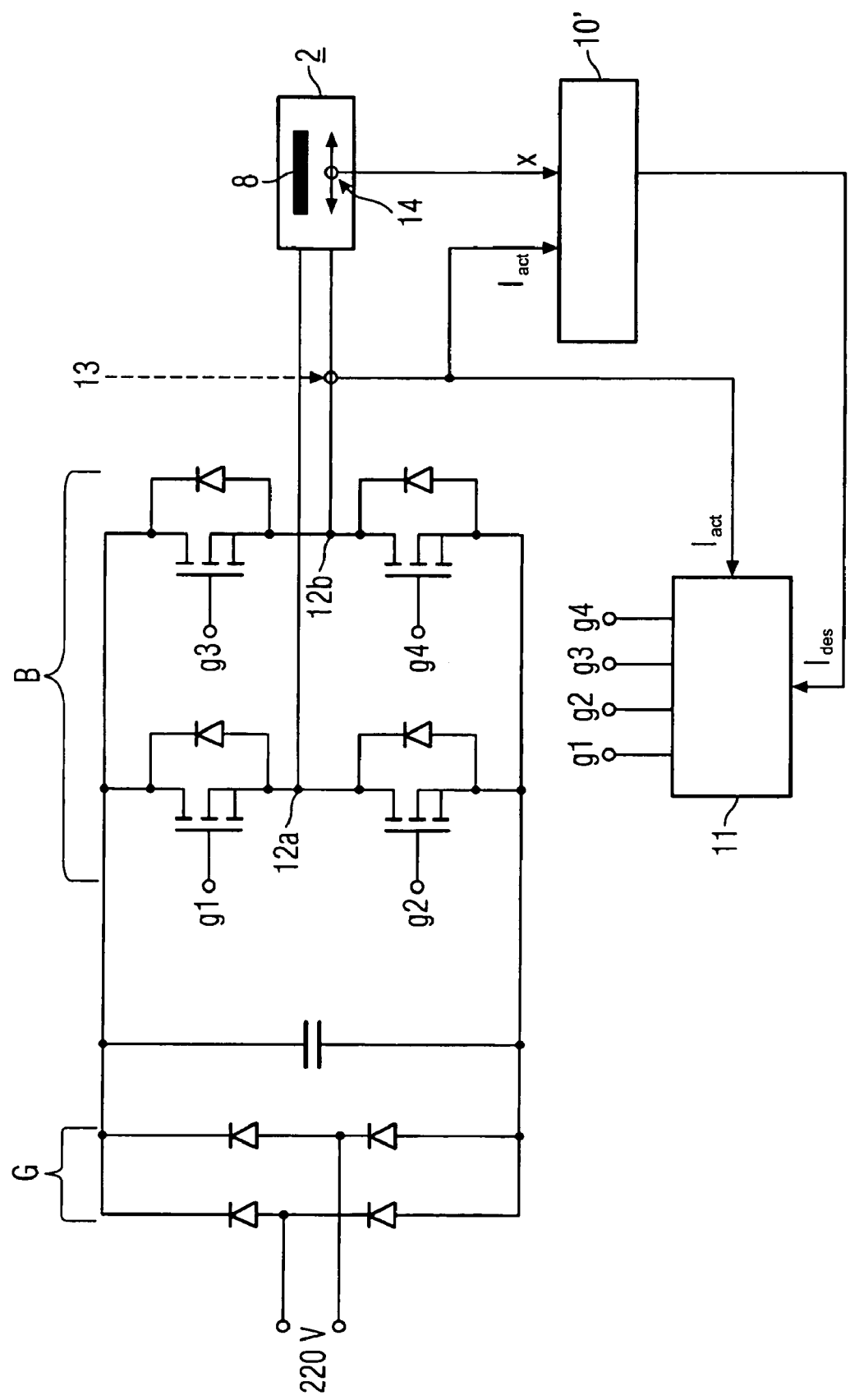

DEVICE FOR ADJUSTING THE ARMATURE STROKE IN A REVERSIBLE LINEAR DRIVE UNIT

The invention relates to a device for adjusting the armature stroke in a reversible linear drive unit comprising at least one excitation coil to be acted upon by an excitation-coil current and a magnetic armature which is to be set in linear oscillating motion in an axial direction with a predefined armature stroke by a magnetic field of the excitation coil. A corresponding linear drive unit is deduced from JP 2002-031054 A.

Corresponding linear drives are used in particular for setting pump pistons of compressors in a linear oscillating motion or oscillation. The system comprising such a compressor with an associated linear drive is thus designated as a linear compressor (see the JP-A specification mentioned initially). In corresponding known linear compressors the vibratory armature optionally suspended by means of at least one spring element forms a spring-mass system which is designed for a certain oscillation frequency with a given force-distance characteristic of the compressor.

Various methods for regulating an armature position or for regulating an armature stroke in a corresponding linear compressor are known. In the known method however, a direct continuous measurement of the armature position is usually dispensed with.

Hitherto, for detecting the current armature position, this is either determined non-discontinuously, e.g. discontinuously by closing an electric contact when the armature has reached a certain position. A continuous position measurement is also known, e.g. by means of the voltage induced in the excitation coil.

It is thus the object of the present invention to construct the regulating device provided with the features specified initially such that a precise adjustment of the armature stroke can be made.

This object is achieved by the measures specified in claim 1. Accordingly, the regulating device should comprise
means for detecting the actual armature position.
means for measuring the actual excitation coil current and
means for adjusting the excitation coil current such that during each half-wave of the armature motion in the steady state of the armature, the armature is supplied with precisely the amount of energy such that the oscillation amplitudes of the predefined armature stroke are reached.

In the measures according to the invention, the consideration is taken as the starting point that in order to achieve a desired armature stroke, which is composed of the two oscillation amplitudes, a certain amount of energy must be supplied electrically to the armature per half-wave and specifically, during an expansion half-wave to pre-tension the at least one spring element which may be present and during a compression half-wave to perform mechanical work on the armature and on any compressor part which may be connected thereto. Even in the steady state, the amounts of energy required for the compression and expansion half-waves are generally different and not known in advance. Instead, both values must be estimated from the oscillation amplitudes which are actually established.

The basic consideration of the regulating concept according to the invention now consists in the fact that a (quasi) continuous measurement of the armature position not only allows the armature stroke to be measured, i.e. the maximum deflection, but also permits measurement of the electrical energy input to the armature. This is possible because the electrical energy input is proportional to the integral of the coil current over the armature position. The coil current is switched off per half-wave at the time when sufficient energy has been input electrically into the armature. The coil current is switched on again with every reversal of the armature direction, the sign being such that the direction of the electromagnetic force on the armature and its direction of motion agree. This is followed by the energy measurement and then the current is switched off again.

In addition to the position measurement, the speed and therefore the kinetic energy of the armature can be determined per half-wave at at least one fixed position, a so-called trigger position. The trigger position is preferably determined in the area of the maximum speed of the armature. No separate sensor needs to be used for the speed measurement but this can be deduced from the quasi-continuous position measurement by differentiation. Furthermore, the energy stored in the armature can be determined from the detection of the speed.

During the expansion half-wave, linear operating parameters such as, for example a spring constant or the current-force transmission constant can be estimated from the position and speed measurements at the at least one trigger position, the position measurement of the dead-centre point facing away from the compressor at which the expansion half-wave ends and the measurement of the electrically influenced energy in the armature. During the compression half-wave, compressor parameters such as the mechanical energy used in the compressor per cycle, the difference between the blow-out and suction pressure at the compressor and/or the force-distance characteristic of the compressor can be determined from the corresponding measurements.

The regulating concept according to the invention can thus achieve reliable start-up of a linear compressor and reliable operation under fluctuating external conditions i.e. in the event of fluctuations in the compressor characteristic. In this case, "reliable" means that the piston of the compressor does not overshoot in the compression phase and hit against a piston plate or a valve plate. Furthermore, the so-called dead volume of the compression chamber of the associated linear compressor can be regulated very accurately with the regulating concept; this is a basic prerequisite for a very high overall efficiency, for example, a cooling capacity, of the linear compressor.

Further advantageous embodiments of the regulating device according to the invention are obtained from the dependent claims. In this case, the embodiment according to claim 1 can be combined with the features of one of the dependent claims or preferably with those of several dependent claims. Accordingly, the following additional features can be provided for the regulating device:

Thus, the current adjusting means as a control element of the current regulation can comprise a rectifier circuit and a following bridge circuit provided with adjustable bridge cross-links in a so-called H-arrangement. In this case, MOSFETS can preferably be provided as adjustable bridge cross-links.

The measured excitation coil current is advantageously supplied as an actual current input quantity to a current regulating module associated with the bridge cross-links, which switches the bridge cross-links such that the actual current signal is tuned to a desired current signal generated by a position regulator module and correlated with the actual armature position, preferably following said signal. Optionally, the actual current signal should be supplied to the position regulator module.

Instead of the afore-mentioned speed and energy determination of the armature using at least one trigger position, means for continuously detecting the speed of the armature (8) can advantageously also be provided. In this case, the energy stored in the armature can be deduced from the speed detection by using appropriate means.

In addition, means for regulating the oscillation frequency of the armature can also be provided. These means can use the signals from the position and optionally from the speed measurement.

Further advantageous embodiments of the regulating device according to the invention are obtained from the dependent claims not discussed previously.

The invention is explained in further detail hereinafter using preferred exemplary embodiments with reference to the drawings. In the figures FIG. 1 is a highly schematic cross-sectional view of a part through a linear drive known per se, FIG. 2 is a block diagram of a first embodiment of a regulating device according to the invention and FIG. 3 is a block diagram of a further embodiment of such a regulating device.

In the figures corresponding parts are each provided with the same reference numerals.

Figure 2:
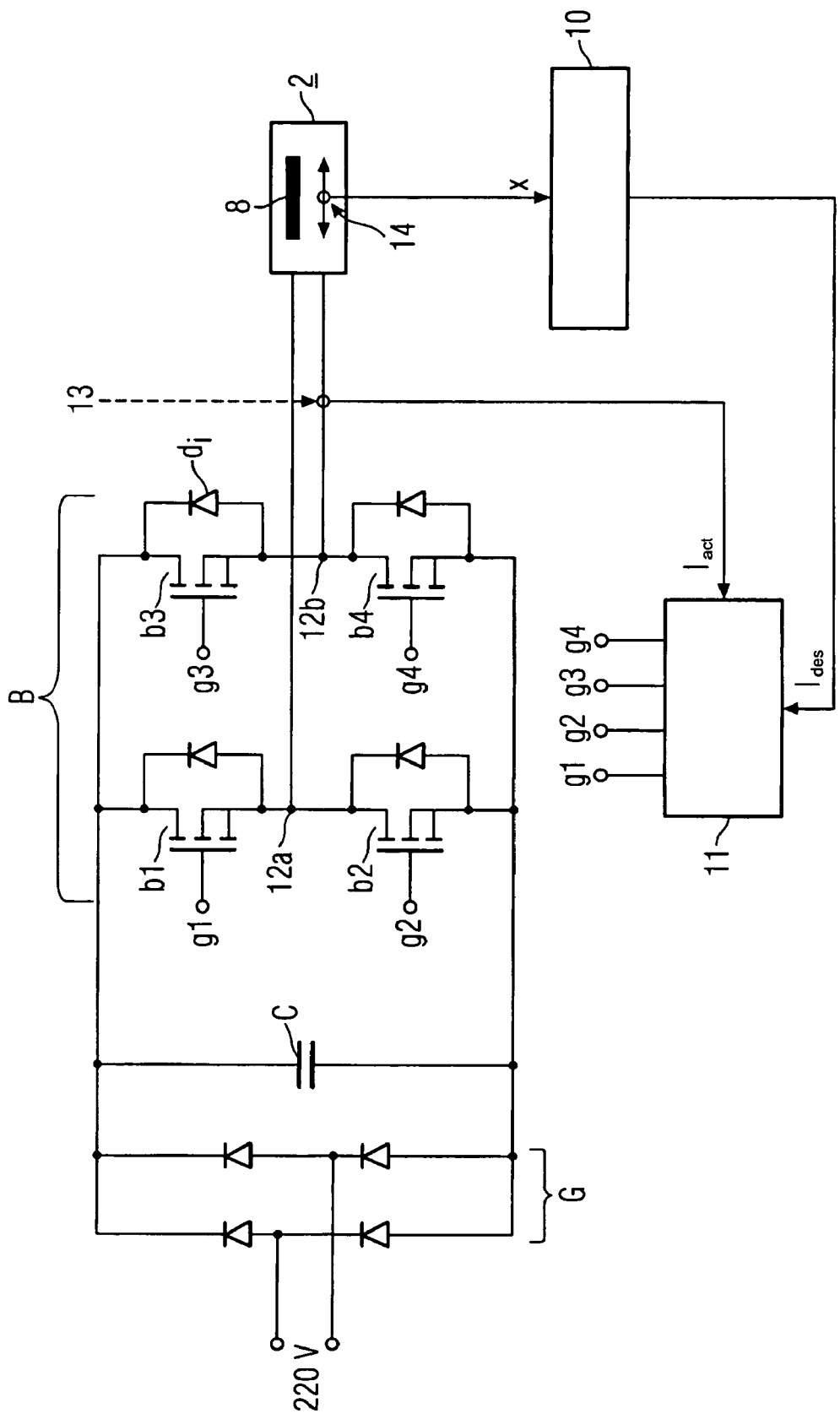

In the case of the reversible linear drive according to the invention shown in FIG. 1, embodiments known per se are assumed such as those provided for linear compressors (see the JP-A specification mentioned previously). The figure shows schematically substantially only the upper part of a cross-section through such a linear drive 2; i.e. the figure only shows the details located on one side of an axis or plane of symmetry S which extends in an axial direction of motion. The linear drive 2 comprises at least one excitation coil 4 to which at least one magnetic-flux-carrying yoke body 5 is assigned. A magnetic armature or armature portion 8 comprising, for example, two permanent magnets whose directions of magnetisation are indicated by arrowed lines m1 and m2, is located in a channel-like or slit-like opening 7 of this yoke body. The armature, also designated as "armature carriage" comprises axially lateral extension parts not described in detail. Said armature can execute an oscillating movement e.g. about a position (marker) P in the variable magnetic field of the coil 4 in the axial direction, oscillating about a centre position Mp. The maximum deflection from the centre position in the axial direction x, i.e. the oscillation amplitude, is designated by +L or –L. The armature stroke H is consequently ($L_1+L_2$).

As is further indicated in the figure, optionally two fixedly clamped leaf springs 9 and 9' on both sides of the centre position Mp can act on extended parts of the armature 8 with their oscillatory points of application A or A'. Naturally, embodiments of a linear drive without springs are also possible. Furthermore, on at least one side of the extension part of the armature 8, this can advantageously be rigidly connected to a compressor V not shown in detail in the figure or its pump piston.

In the embodiment shown in the figure, it is further assumed that the linear drive 2 has a symmetrical structure with respect to the plane S, i.e. yoke bodies and optionally also excitation coil parts are located on both sides of the plane. Naturally, a linear drive can also be provided for a regulating device according to the invention, which comprises an excitation coil only on one side and only one magnetic-flux-carrying yoke body part on the opposite side (see, e.g. U.S. Pat. No. 6,323,568 B1). In addition, to the E-shape of the yoke body which is shown, other types of yoke bodies such as M-shaped are also suitable.

When the armature 8 of the linear drive 2 is connected to a pump piston of a compressor 7, the armature energy threshold $E_s$ for the expansion and compression half-wave is generally different; i.e. a distinction should be made between two armature energy thresholds, namely $E_{s,exp}$ and $E_{s,comp}$. The two armature energy thresholds vary in time as a result of the time variations of the force-distance characteristic, where the variations are slow compared to the duration of the oscillation period of the linear drive. For this reason, an adaptation of the two values superimposed on the actual stroke regulation is appropriate and possible.

A regulating device which adjusts the current in the excitation coil 4 is used to regulate the armature stroke H or the oscillation amplitudes $+L_1$ and $-L_2$. FIG. 2 is a block diagram of a first embodiment of such a regulating device. In the figure, G is a rectifier circuit, e.g. in the form of a bridge circuit, where C is a smoothing capacitor, B is a converter circuit in the form of a so-called full bridge, b1 to b4 are four bridge-link members of this converter circuit in a so-called H arrangement, 10 is a position regulator module and 11 is a current regulator module.

Possible bridge-link members b1 to b4 in particular are MOSFETs (Metal Oxide Semiconductor Field Effect Transistors) with protective diodes $d_i$. Their control electrodes or control gates are designated by g1 to g4. They are connected to corresponding outputs of the current regulator module 11. The excitation current for the excitation coil of the linear drive 2 is taken from bridge tapping points 12a and 12b of the bridge circuit B. In this case, an actual current of the winding designated as $I_{act}$ is determined by measuring the voltage drop over a shunt resistance in the bridge path connected in series with the coil or two shunt resistances located between the bridge-link members $b_2$ and $b_4$ and earth.

The measured value of this current is then supplied to the current regulator 11 at a connection point 13 in the power supply lead of the excitation coil. The current regulator 11 can, for example, comprise a known PWM (Pulse Width Modulation) module. Alternatively, a two-point controller known per se having a fixed clock frequency of, for example, 20 kHz can be used as a current regulator.

A measuring device 14 known per se, not described in detail, is attached to the linear drive 2, this being used to detect the precise actual position x and the direction of movement of the armature 8 of the apparatus. Its measured value x is fed to the position regulator module 10 which calculates a desired current $I_{des}$ from the position x and quantities derived therefrom such as the armature speed in particular and supplies this to the current regulator module 11. The current regulator module ensures that good agreement is obtained between the desired current $I_{des}$ and the actual current $I_{act}$ by controlling the control gates g1 to g4.

The block diagram of another regulating device according to the invention reproduced in FIG. 3 only differs from that in FIG. 2 in that here the measured current $I_{act}$ is also the input quantity for the modified position regulator module 10' compared with FIG. 2. In this embodiment, more significant deviations can occur between the desired current $I_{des}$ and the actual current $I_{act}$;

however, the current regulator module 11 is capable of switching off the current in the desired manner by means of corresponding adjustments.

The algorithm for a position regulation in the devices shown in the block diagrams in FIGS. 2 and 3 is indicated hereinafter:

The electromagnetic force F acting on the armature 8 is always proportional to the actual coil current $I_{act}$; i.e. $F = K \cdot I_{act}$, where F, k and $I_{act}$ depend on the position x.

When changing the direction of motion of the armature, the coil current is reversed so that the electromagnetic force $F = K \cdot I_{act}$ acts in the direction of motion x.

The potential and the kinetic energy of the armature are then determined from the instantaneous position and speed measurement either continuously or using at least one particular trigger signal, which for example is allocated to the zero crossing of the armature position and advantageously lies close to the armature position having the maximum kinetic energy.

The energy supplied to the armature per oscillation half-wave is calculated using the equation If the armature energy reaches a threshold value $E_{s,comp}$ or $E_{s,exp}$ which corresponds to the desired oscillation amplitude $+L_1$ or $-L_2$, the current I is switched off.

In addition to this basic algorithm, a superposed adaptation algorithm is also possible where the armature energy threshold $E_{s,comp}$ or $E_{s,exp}$ is adapted by comparing the measured oscillation amplitude $+L_1$ or $-L_2$ with the corresponding desired amplitude.

The regulating concept realised in the block diagrams thus has the following main elements:

1. Measured Quantities:
   Position x, direction of motion and speed of the armature 8 derived therefrom; current $I_{act}$.
2. Control Quantity:
   Excitation coil current. In this case, several variants of the control element are feasible for regulating the current, where the actual and desired current can differ appreciably from one another depending on the control element.
3. Regulating Principle:
   Excitation coil current is switched so that the electromagnetic force on the armature is (almost) always acting in the direction of motion of the armature; measurement of the electrically influenced energy in the armature per oscillation half-wave; current switched off when the energy threshold is reached.
   Advantages of this Regulating Principle:
   Electrical braking of the armature is largely avoided; this results in good efficiency. The frequency of the armature oscillation is largely determined by the moving mass and spring constant of any spring(s) which may be present and the force-distance characteristic of the associated compressor but can be modified by selecting the duty cycle by means of current regulation: if a higher current acts over a shorter distance after reversal of the motion, the oscillation frequency increases whilst the electrical energy input per oscillation half-wave remains the same.

REFERENCE LIST

2 Linear drive
4 Excitation coil
5 Yoke body
7 Gap
8 Armature
9, 9' spring constant
10, 10' position regulator module
11 Current regulator module
12a, 12b Bridge tapping points
13 Connection point
S Plane of symmetry
m1, m2 Directions of magnetisation
A, A' Spring application points
H Armature stroke
x Axial position
$+L_1$, $-L_2$ Oscillation amplitudes
V Compressor
Mp centre position
G Rectifier circuit
C Smoothing capacitor
B Bridge circuit
b1 to b4 MOSFET bridge-link members
g1 to g4 Controller
$d_i$ Protective diodes
$I_{act}$ Actual current
$I_{des}$ Desired current

The invention claimed is:

1. A device for regulating the armature stroke in a reversible linear drive unit comprising:
   an excitation coil acted upon by an excitation coil current and providing a magnetic field;
   a magnetic armature which is set in linear oscillating motion in an axial direction with a predefined armature stroke by the magnetic field;
   means for detecting the actual armature position;
   means for measuring the actual excitation coil current;
   means for adjusting the excitation coil current during each half-wave of the armature motion in the steady state of the armature; and
   the armature being supplied with the amount of energy such that the oscillation amplitudes of the predefined armature stroke are reached.

2. The device according to claim 1, further comprising a spring element coupled to the armature and facilitating the oscillation of the armature.

3. The device according to claim 1, wherein means for adjusting the excitation coil current includes a rectifier circuit and a following bridge circuit with adjustable bridge cross-links in an H-arrangement.

4. The device according to claim 3, wherein the adjustable bridge cross-links are MOSFETS.

5. The device according to claim 3, wherein the measured excitation coil current is supplied as an actual current input quantity to a current regulating module associated with the bridge cross-links, which switches the bridge cross-links such that the actual current signal is tuned to a desired current signal generated by a position regulator module and correlated with the actual armature position following the signal.

6. The device according to claim 5, wherein the actual current signal is supplied to the position regulator module.

7. The device according to claim 1, further comprising means for continuously detecting the direction of motion of the armature.

8. The device according to claim 1, further comprising means for continuously detecting the speed of the armature.

9. The device according to claim 1, further comprising a trigger position for a speed measurement at a fixed position within the armature travel.

10. The device according to claim 9, wherein the trigger position is provided in the area of the maximum speed of the armature.

11. The device according to claim 8, further comprising means for deriving the energy stored in the armature from the speed determination.

12. The device according to claim 1, further comprising means for regulating the oscillation frequency of the armature.

13. The device according to claim 1, wherein the armature is rigidly connected to a pump piston of a compressor.

* * * * *